United States Patent
Chludek et al.

(10) Patent No.: US 7,563,190 B2
(45) Date of Patent: Jul. 21, 2009

(54) DIFFERENTIAL CROSS MEMBER FOR A DIFFERENTIAL DRIVE

(75) Inventors: Adrian Chludek, St. Augustin (DE); Horst Görlich, Steimel (DE)

(73) Assignee: GKN Driveline International GmbH, Lohmar (DE)

( * ) Notice: Subject to any disclaimer, the term of this patent is extended or adjusted under 35 U.S.C. 154(b) by 407 days.

(21) Appl. No.: 10/576,406

(22) PCT Filed: Oct. 18, 2004

(86) PCT No.: PCT/EP2004/011716
§ 371 (c)(1), (2), (4) Date: Jan. 19, 2007

(87) PCT Pub. No.: WO2005/040641
PCT Pub. Date: May 6, 2005

(65) Prior Publication Data
US 2008/0032847 A1 Feb. 7, 2008

(30) Foreign Application Priority Data
Oct. 20, 2003 (DE) ................................. 103 48 546

(51) Int. Cl.
*F16H 48/06* (2006.01)
(52) U.S. Cl. ...................................................... 475/230
(58) Field of Classification Search ........................ None
See application file for complete search history.

(56) References Cited
U.S. PATENT DOCUMENTS

| | | | | |
|---|---|---|---|---|
| 2,720,797 A | * | 10/1955 | Huddleston et al. | 475/243 |
| 3,894,447 A | | 7/1975 | Michael | |
| 3,974,717 A | * | 8/1976 | Breed et al. | 475/86 |
| 5,979,624 A | | 11/1999 | Chludek | |
| 7,081,065 B2 | * | 7/2006 | Sudou | 475/230 |

FOREIGN PATENT DOCUMENTS

| | | |
|---|---|---|
| DE | 1 827 697 | 3/1961 |
| DE | 36 34 394 | 4/1987 |
| DE | 44 24 202 | 4/1996 |
| DE | 199 19 515 | 11/2000 |
| EP | 0 864 779 | 9/1998 |

* cited by examiner

*Primary Examiner*—Dirk Wright
(74) *Attorney, Agent, or Firm*—Rader, Fishman & Grauer, PLLC

(57) ABSTRACT

A differential carrier (11) for a differential drive, which differential carrier (11) is supported so as to be rotatable around its longitudinal axis (A) and which is rotatingly drivable, having two output gears (18, 19) supported in the differential carrier coaxially relative to the longitudinal axis (A), and having four differential gears which are rotatably supported on a cross member with four bearing arms extending radially relative to the longitudinal axis (A) and being held in the differential carrier (11) and said differential gears engage said output gears (18, 19), wherein two first cross member bearing arms positioned opposite one another are connected to one another and form at least one central transverse aperture (38) and that two second cross member bearing arms positioned opposite one another are produced separately from one another and, by means of their inner ends (28, 29) are inserted into the at least one transverse aperture (38).

21 Claims, 7 Drawing Sheets

DIFFERENTIAL CROSS MEMBER FOR A DIFFERENTIAL DRIVE

TECHNICAL FIELD

The invention relates to a differential carrier for a differential drive, which differential carrier is supported so as to be rotatable around its longitudinal axis A and which is rotatingly drivable, having two output gears arranged coaxially relative to the longitudinal axis A in the differential carrier, and four differential gears which are rotatably arranged on a cross member with four bearing arms held radially relative to the longitudinal axis A in the differential carrier and whose teeth engage the teeth of the differential gears.

BACKGROUND

A differential carrier of said type is known from DE 199 19 515 C2 wherein four wedge-shaped bearing arms for four differential gears are welded centrally to a cross member. The disadvantage of this design is that the arms have to be clamped into a suitable device and that, after the cross member has been welded, the arms have to be straightened. The costs of the welding operation applying said setting-up and straightening operations are disadvantageously high.

EP 0 864 779 A1 proposes a differential drive with four bearing arms for four differential gears. Two of the bearing arms have been produced in one piece and comprise a transverse bore. The two bearing arms extending perpendicularly relative to the one-piece bearing arm are inserted into the transverse bore by means of an inner first portion. The transition from the inserted first portion to the second portion carrying the differential gear is stepped so that there can occur a notch effect.

A similar differential drive with four bearing arms for four differential gears is known from DE 36 34 394 A1. The bearing arms comprise circumferentially distributed lubricating grooves for slidingly supporting the differential gears on the bearing arms. The bearing arms are received in radial bores in the differential carrier and held by a securing ring extending around the differential carrier.

DE 44 24 202 C1 describes a differential drive which, for actuating purposes, comprises a friction coupling arranged in the differential carrier.

SUMMARY OF THE INVENTION

The invention to propose a differential carrier of the initially mentioned type which, in the region of the cross member of the differential carrier, offers an improved solution with a higher degree of stiffness.

The objective is achieved in that two first bearing arms of the cross member positioned opposite one another are connected to one another and form at least one central transverse aperture, and that at least one second bearing arm of the cross member is produced separately and comprises a first portion for being inserted into the at least one transverse aperture, a second portion for receiving the associated differential gear, as well as a transition portion connecting the first and the second portion and having a diameter continuously increasing towards the second portion. This measure makes it possible to reduce the number of arm parts to two and to assemble the cross member in the form of a plug-in connection in the differential carrier. Because the assembly operation only takes place in the differential carrier, there is achieved an improved method of mounting the differential gears on the arms, which method permits the use of a differential carrier which, at least at one end, is closed in a dish-like way and which does not need assembly apertures for the differential gears around the circumference. In case use is made of two first bearing arms and only one second bearing arm, any out-of-balance which might occur can be compensated by suitable compensating masses at the differential carrier. A symmetric cross member assembly is obtained if a total of four bearing arms is used, with two second bearing arms being plugged into two first bearing arms.

In one embodiment, the first arms are connected to one another so as to form one piece, wherein, at a continuous round bar, only the transverse bore for receiving the second arms has to be produced. In principle, it would also be possible to weld together two individual arms with semi-cylindrical recesses at their ends while forming an inner transverse aperture.

Instead of the transverse bore between the two first arms, it is also possible to provide two counter bores in the connecting region of the two first arms, into which the two second arms can be inserted by their inner ends, but only as far as the base of the counter bore.

In the case of the first bearing arms, the ratio of the first diameter (d) of the transverse aperture relative to the second diameter of the bearing region ranges between 0.4 and 0.6, which values include the limit values. For the second bearing arms, too, it is particularly advantageous if the ratio of the first diameter (d) to the second diameter (D) ranges between 0.4 and 0.6. There is thus obtained an optimum strength of the webs surrounding the transverse bore relative to the inserted first portion of the second arm.

In a further embodiment, the transition portion of the inserted arm in the region adjoining the first portion comprises a first radius (R1) with a ratio of $0.4 < R1/D < 0.6$, with (D) being the diameter of the second portion. In the region adjoining the second portion, the transition portion comprises a second radius (R2), and in this case, too, a ratio of $0.4 < R1/D < 0.6$ is particularly advantageous. Between the two radii R1, R2, there is provided a conical outer face which, together with the arm axis, encloses an angle (a) which is smaller than an angle enclosed between an imaginary conical face enveloping the transition portion and the longitudinal axis. As a result of this measure, the notch effect in the second bearing arms is minimized, so that there is achieved a particularly advantageous stress distribution.

The arms can be inserted into continuous radial bores in the differential carrier and, towards the outside, they can be by securing rings inserted into said radial bores. The differential gears can be slidingly supported on the arms. To improve lubrication it is proposed to provide the arms with longitudinally extending lubricating grooves or lubricating pockets or circumferentially distributed lubricating grooves which partially extend beyond the bearing region of the differential gears, so that lubricant can be supplied to the bearing region.

According to an advantageous embodiment, the dish-shaped differential carrier comprises a formed-on flange at the end being closed in a dish-like way, with the differential carrier, at its end positioned axially opposite the flange, being closed by a cover. To the extent that it is proposed to provide a differential drive in the form of a lockable differential drive, a plate package is arranged in the differential carrier between the assembly consisting of the cross member, differential gears and output gears on the one hand and said cover on the other hand. To the extent that the differential drive is provided with a differential-speed-sensing actuating device, for example of the shear pump type, said actuating device is preferably inserted between the plate package and the cover.

Irrespective of the fact that differential bevel gears and output bevel gears are shown, it is also possible to provide the differential gears in the form of spur gears and the output gears in the form of crown gears.

BRIEF DESCRIPTION OF THE DRAWINGS

A preferred embodiment of the invention is illustrated in the drawings and will be described below.

DETAILED DESCRIPTION

Figure 1:
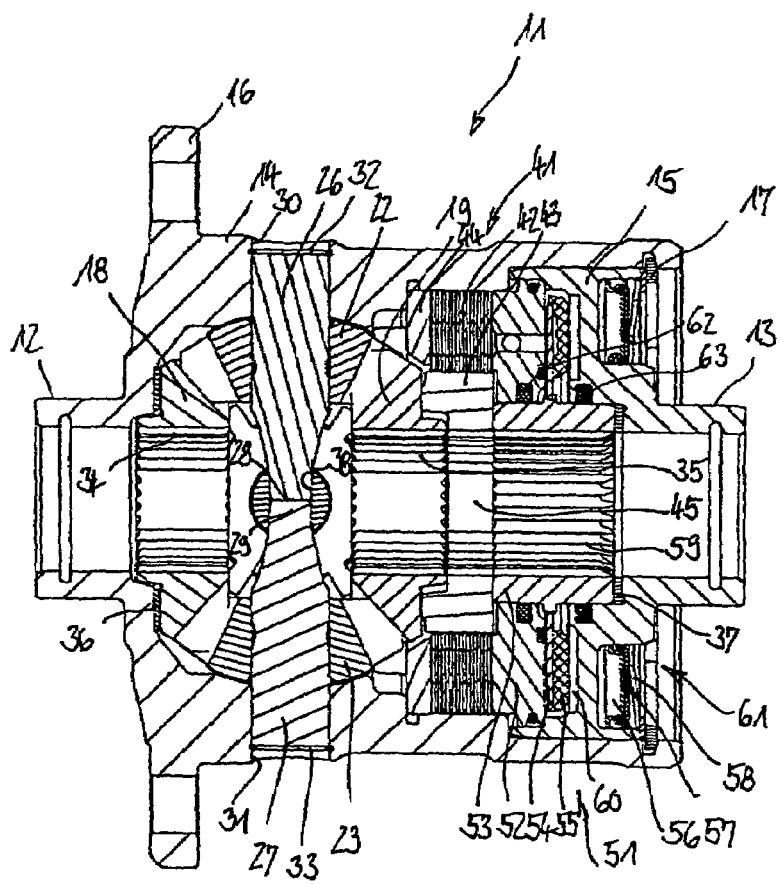
FIG. 1 shows a differential carrier with an inventive cross member in a longitudinal section.

FIG. 1 shows a differential carrier 11 which has to be rotatably supported in the housing of the differential drive. Such support is provided more particularly on two sleeve projections 12, 13 which extend coaxially relative to the longitudinal axis A of the differential carrier. The differential carrier includes a dish-shaped first part 14 with an integrally formed on flange 16 and a cover 15 inserted into the first part 14. A ring gear for rotatingly driving the differential carrier can be bolted to said flange. The first sleeve projection 12 is integrally connected to the first part 14 and the second sleeve projection 13 is integrally connected to the cover 15. The cover 15 is held by a securing ring 17 in contact with a step in the dish-shaped part 14. The securing ring 17 comprises an outwardly pointing conical face, so that the cover 15 is fitted without play in the first part 14. In the differential carrier 11 there are arranged two output bevel gears 18, 19 arranged coaxially relative to the longitudinal axis A, as well as a number of (four) differential bevel gears whose axis of rotation extend radially relative to the longitudinal axis A and of which two (22, 23) can be identified in this Figure. The teeth of the four differential bevel gears engage those of the two output bevel gears 18, 19 and they are uniformly distributed around the circumference. The visible differential bevel gears 22, 23 run slidingly on second bearing arms 26, 27 which have been inserted into radial bores 30, 31 in the first part 14 and are held therein on the radial outside by securing rings 32, 33. By their inner ends 28, 29, whose diameter has been reduced, the second bearing arms 26, 27 are directly supported on one another. By a first pair of bearing arms 24, 25 which will be described later, said arms are supported laterally and held relative to one another. The differential carrier 11 in the embodiment as shown here is part of a lockable differential drive and comprises a multi-plate coupling 41 and a shear pump assembly 51 such as they are described for example in the applicant's publication DE 196 19 891 C2. Therefore, only the most important details are mentioned. The multi-plate coupling 41 comprises a plate package 42 including first plates connected to the housing part 14 in a rotationally fast way, and second plates connected to a coupling hub 43. The plate package 42 is axially supported on a supporting disc 44 in the first part 14 if it is axially loaded by a setting piston 52 of the shear pump assembly 51. Furthermore, the shear pump 51 comprises a shear plate 54 connected to a pump hub 53 and a shear groove and control element 55 which is rotatable to a limited extent relative to the cover part 15 which at the same time forms the pump housing. In the cover part 15, there is formed a pump chamber 60 which contains the shear plate 54 and the shear groove and control element 55. Furthermore, it can be seen that the cover part 15 contains a reservoir 61 which is formed by an annular chamber 56, an annular cover 57 and a plate spring 58, which reservoir is connected to the pump chamber 60 of the shear pump 51 by bores (not illustrated). The output bevel gear 18 comprises inner teeth 34 into which a first sideshaft can be inserted; the output bevel gear 19 comprises second inner teeth 35 into which a second output shaft can be inserted. Inner teeth 45 of the coupling hub 43 and inner teeth 59 of the pump hub 53 correspond to the inner teeth 35 of the output bevel gear 19. By inserting a second sideshaft, the output bevel gear 19, the coupling hub 43 and the pump hub 53 are connected to one another in a rotationally fast way. As a result, if there occurs a speed differential between the output bevel gear 19 and the differential carrier 11, there is built up a pressure in the shear pump 51 by which the piston 52 is displaced against the plate package 42, so that the output bevel gear 19 is braked relative to the differential carrier 11. The piston 52 and the cover 15 are sealed relative to the pump hub 53 by seals 62, 63. The output bevel gear 18 and the pump hub 53 are supported in an axially low-friction way relative to the differential carrier 11 by friction discs 36, 37.

Figure 2:
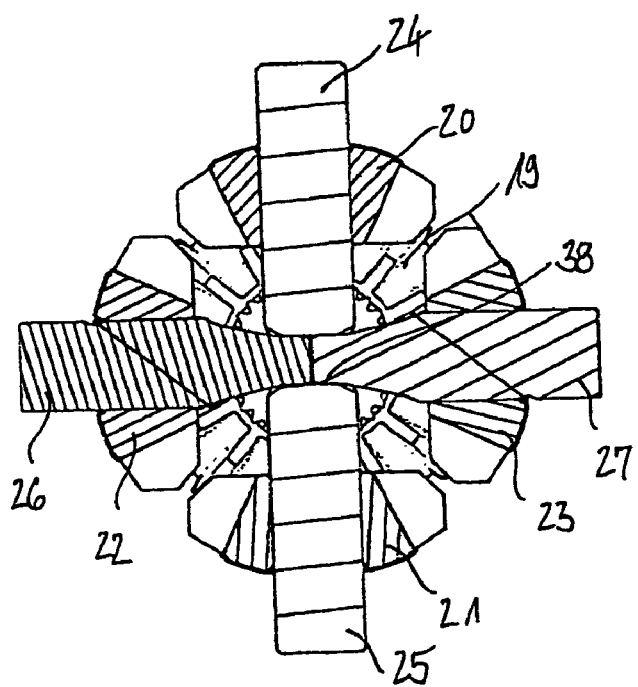
FIG. 2 shows the cross member according to FIG. 1 with placed-on differential gears in a cross-section.

FIG. 2 shows the assembly consisting of differential bevel gears 20, 21, 22, 23 and bearing arms 24, 25, 26, 27 in the form of a sub-assembly in a view extending in the direction of the longitudinal axis A (not illustrated). It can be seen that the first arms 24, 25 are produced in one piece and comprise a transverse bore 38 into which it is possible to plug the second arms 26, 27 by their inner first portions 28, 29 in a substantially play-free way, so that they are secured transversely to their longitudinal extension. Furthermore, it can be seen that the second arms 26, 27 are produced separately from one another and abut one another by their inner first portions 28, 29 in a planar way. As a result of the design of the differential carrier 11 shown in FIG. 1 and the bearing arm and differential gear assembly shown here, the differential gears 20, 21, 22, 23 can be introduced into the first housing part 14 before the cover 15 is mounted. Then the arm assembly 24, 25 is initially introduced transversely into the differential carrier 11, with the differential bevel gears 20, 21 being threaded on to their bearing arms and finally the arms 26, 27 are inserted radially into the differential carrier, with the differential bevel gears 22, 23 being threaded onto their bearing arms which are inserted into the transverse bore 38 until they abut one another. Then the bearing arms 24, 25, 26, 27 can be secured by securing rings in the differential carrier.

Figure 3:
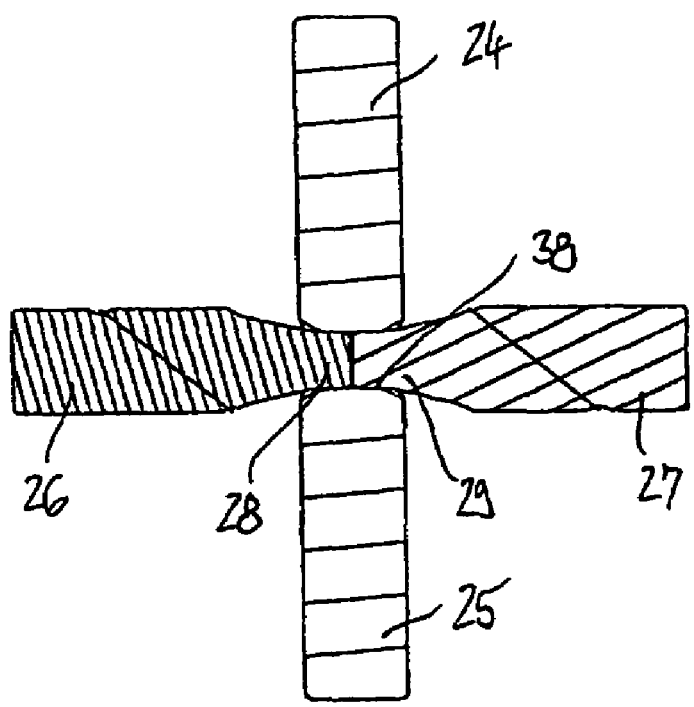
FIG. 3 shows the cross member according to FIG. 2 in detail.

In FIG. 3, any details identical to those shown in FIG. 2 have been given the same reference numbers. To that extent, reference is made to the description of FIG. 2. Only the cross member assembly is shown. Inclined lines indicate lubricating grooves 68, 69 in the arms 26, 27.

Figure 4:
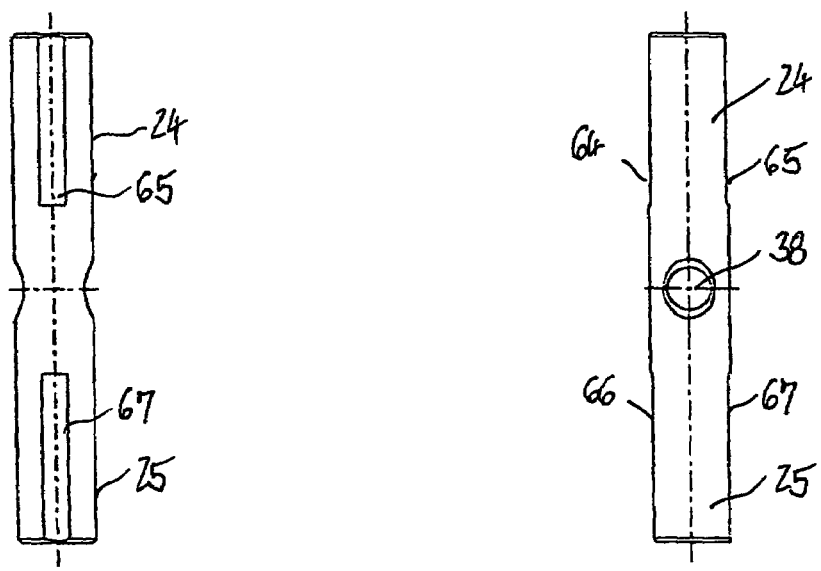
FIGS. 4A and 4B show the two first arms of the inventive cross member according to FIG. 3.

In FIG. 4, the pair of arms 24, 25 produced so as to form one piece and having the transverse bore 38 is shown as a detail. Furthermore, in the region of the differential gear bearing, there is shown a pair of flattened portions 64, 65, 66, 67 at the arms which serves to supply lubricant to the bearing region of the differential gears.

Figure 5:
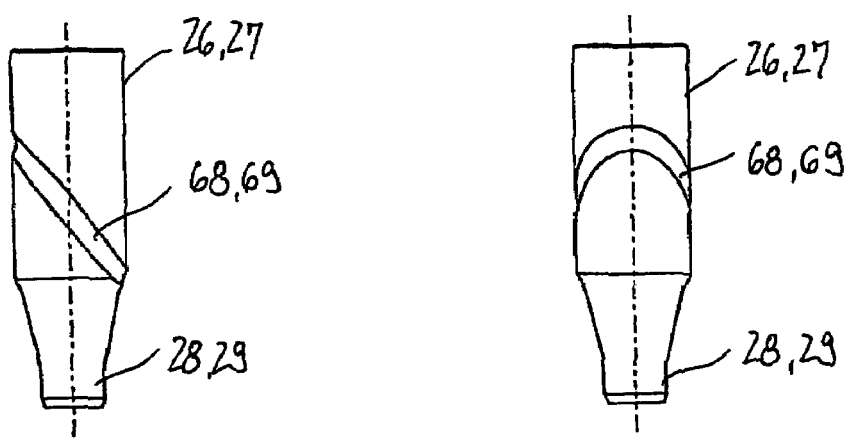
FIGS. 5A and 5B show one of the two second arms of the inventive cross member according to FIG. 3 in detail in two views.

FIG. 5 illustrates one of the bearing arms 26, 27 in the form of a detail in two side views, showing the reduction in diameter at the inner ends 28, 29 on the one hand and the lubricating groove 68, 69 in the form of an inclined circumferential groove on the other hand, which also serves to supply lubricant underneath the differential gears.

The types of lubricating grooves according to FIGS. 4 and 5 can also be exchanged or all the lubricating grooves in all the bearing arms can be designed according to the grooves shown in FIG. 4 or 5.

Figure 6:
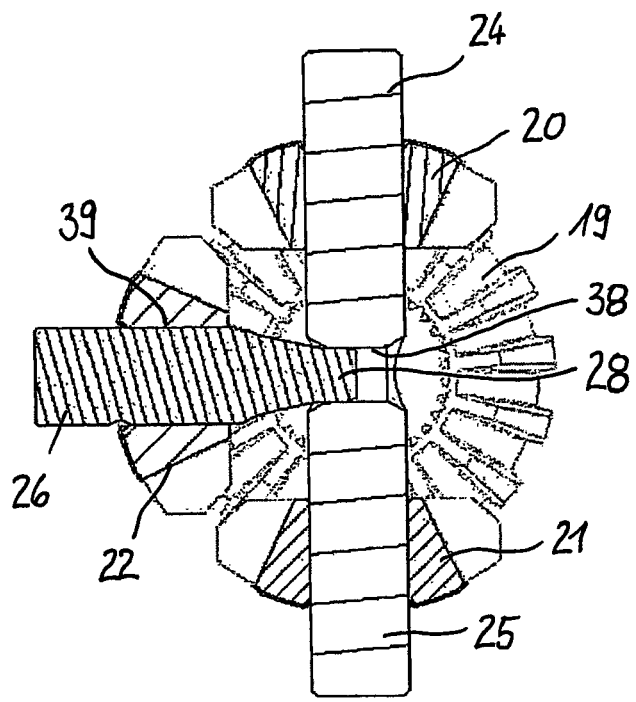
FIG. 6 shows a cross member according to a second embodiment with placed-on differential gears in a cross-section.

FIG. 6 shows a second embodiment of an assembly consisting of differential bevel gears 20, 21, 22 and bearing arms 24, 25, 26 in the form of a sub-assembly in a view in the direction of the longitudinal axis A. Details identical to those shown in FIG. 2 have been given the same reference numbers as in FIG. 2 and to that extent, reference is made to the description of same. The assembly according to FIG. 6 only differs in that there are provided three arms 24, 25, 26 only. The two first arms 24, 25 are produced to from one piece and comprise the transverse bore 38 into which there is inserted the second arm 26 by its first portion 28. This embodiment is cheaper to produce because one bearing arm with the associated differential gear has been eliminated. Out-of-balance conditions can be compensated for by a corresponding distribution of masses in the differential carrier (not shown here).

Figure 7:
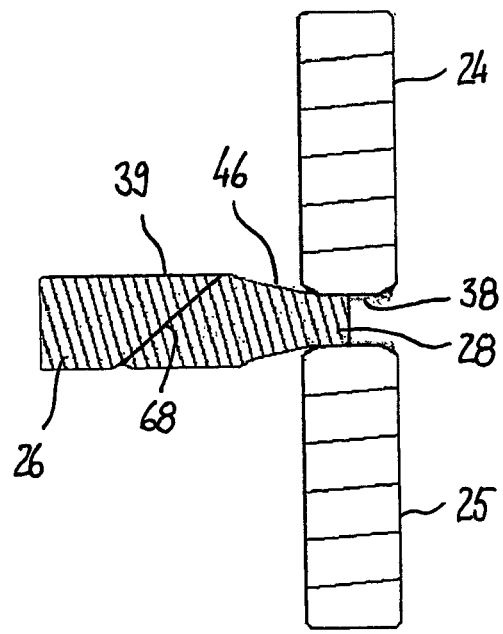
FIG. 7 shows the cross member according to FIG. 6 in detail.

In FIG. 7, any details identical to those shown in FIG. 6 have been given the same reference numbers. To that extent, reference is made to the description of FIG. 6. FIG. 7 only shows the cross member assembly. Inclined lines refer to a lubricating groove 68 in the arm 26.

Figure 8:
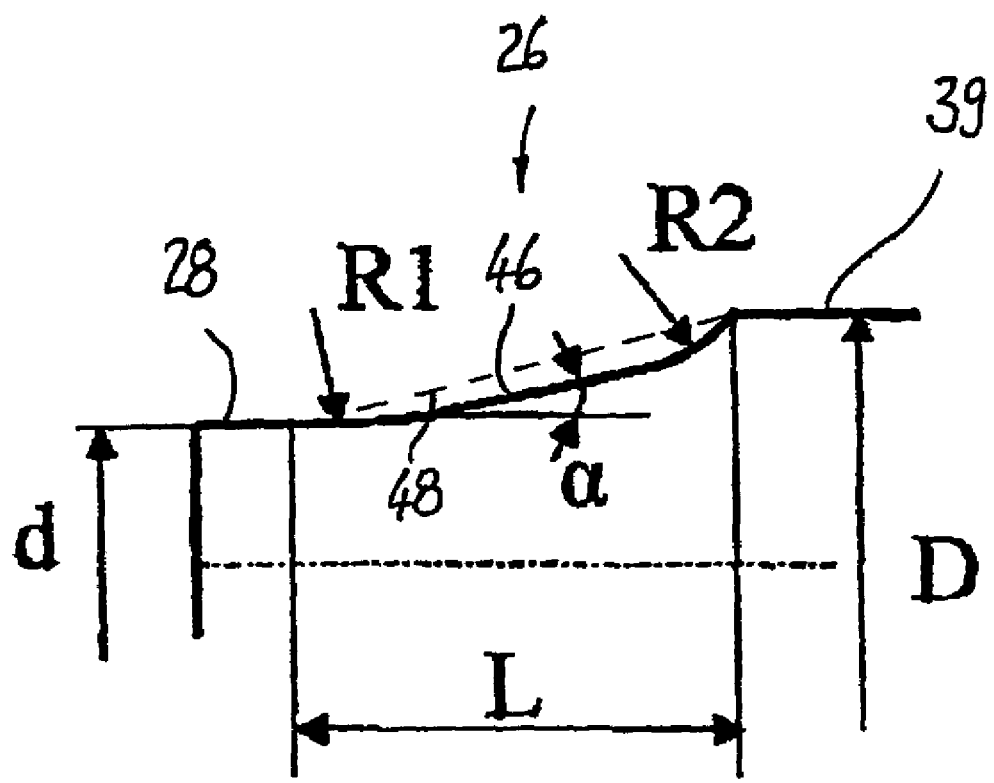
FIG. 8 shows one of the two second bearing arms of an inventive cross member according to any one of the preceding Figures in detail.

FIG. 8 shows the inner end of a second arm 26, 27 according to one of the previous embodiments. It can be seen that the second arm 26 comprises a first portion 28 with a reduced diameter (d) to be inserted into the transverse bore 38 of the first arm 24, 25 (not shown here), a second portion 39 with a greater diameter (D) for supporting an associated differential gear 22 as well as a transition portion 46 connecting the first and the second portion 28, 29 and having a continuously increasing diameter towards the second portion 39. The diameter d of the first portion 28 approximately corresponds to the diameter of the transverse bore 38, with a clearance fit being provided between the arm and the bore. The ratio of the first diameter (d) of the first portion 28 relative to the diameter (D) of the second portion 39 ranges between 0.4 and 0.6, i.e. 0.4<d/D<0.6. This ratio results in an optimum degree of stiffness of the inserted arm 26 relative to the stiffness of the arms 24, 25 with the transverse bore 38. Furthermore, it can be seen that the transition portion 46 in the region adjoining the first portion 28 comprises a first radius (R1) and in the region adjoining the second portion 39 a second radius (R2). The radii (R1) and (R2) have been given particularly long dimensions, so that the notch effect is minimised and there is achieved a uniform distribution of stress. The ratio of the first radius (R1) relative to the diameter (D) of the second portion 39 therefore ranges between 0.4 and 0.6, with the limit values being included, i.e. 0.4<R1/D<0.6. The ratio between the second radius (R2) and the diameter (D) is also 0.4<R1/D<0.6 to achieve an optimum stress curve between the transition portion 46 and the second portion 39. The angle a which is enclosed between a conical outer face of the transition portion 46 and the arm axis is smaller than the angle enclosed between an imaginary conical face 48 enveloping the transition portion 46 and the arm axis. This means that $$a \leq \arctan(0.5 \times (D-d)/L),$$

with L being the length of the transition portion 46. This also results in a particularly high strength value and a good stress distribution.

What is claimed is:

1. A differential carrier for a differential drive, which differential carrier is supported so as to be rotatable around its longitudinal axis (A) and which is rotatingly drivable, comprising:
    two output gears which are supported in the differential carrier coaxially relative to the longitudinal axis (A); and
    a plurality of differential gears which are rotatably supported on a cross member, said cross member having at least three bearing arms extending radially relative to the longitudinal axis (A) and being held in the differential carrier, said differential gears meshingly engage the output gears,
    wherein two first bearing arms of the cross member positioned opposite one another are connected to one another and form at least one central transverse aperture, and
    wherein at least one second bearing arm of the cross member is produced separately from said two first bearing arms and comprises a first portion with a first diameter (d) for being inserted into the at least one transverse aperture, a second portion with a greater second diameter (D) for receiving the associated differential gear, as well as a transition portion connecting the first and the second portion and having a continuously increasing diameter.

2. A differential carrier according to claim 1, wherein the first bearing arms are produced so as to form one piece.

3. A differential carrier according to claim 1 wherein, a ratio of a diameter of the transverse aperture to a diameter of the first bearing arms, in the region of the differential gears, ranges between 0.4 and 0.6.

4. A differential carrier according to claim 1, wherein at the at least one second bearing arm, the ratio of the first diameter (d) of the first portion relative to the second diameter (D) of the second portion ranges between 0.4 to 0.6.

5. A differential carrier according to claim 1, wherein, in the region adjoining the first portion, the transition portion of the inserted arm comprises a first radius (R1), and a ratio of the first radius (R1) relative to the diameter (D) of the second portion ranges between 0.4 and 0.6.

6. A differential carrier according to claim 1, wherein in the region adjoining the second portion, the transition portion comprises a second radius (R2), and a ratio of the second radius (R2) relative to the diameter (D) of the second portion ranges between 0.4 and 0.6.

7. A differential carrier according to claim 1, wherein the transition portion comprises a conical outer face which, together with the arm axis, encloses an angle (a) which is smaller than an angle which is enclosed between a conical face (48) defined by an envelope of the transition portion and the longitudinal axis.

8. A differential carrier according to claim 1 comprising two second bearing arms which directly support one another by their first portions.

9. A differential carrier according to claim 1, wherein the bearing arms are inserted into radial bores in the differential carrier and are secured radially outwardly with securing rings.

10. A differential carrier according to claim 1, wherein the differential gears are directly slidingly supported on the bearing arms.

11. A differential carrier according to claim 1, wherein, in the region of the bearing of the differential gears, the bearing arms comprise lubricating grooves.

12. A differential carrier according to claim 1 comprising an integrally formed-on flange.

13. A differential carrier according to claim 12, comprising a dish-shaped part carrying the flange and a cover which, with reference to the cross member, is arranged axially opposite the flange.

14. A differential carrier according to claim 1, comprising a locking coupling between the assembly comprising the cross member, the differential gears and the output gears; and the cover.

15. A differential carrier according to claim 14, comprising a shear pump between the locking coupling and the cover (15).

16. A differential carrier according to claim 3, wherein at the at least one second bearing arm, the ratio of the first diameter (d) of the first portion relative to the second diameter (D) of the second portion ranges between 0.4 to 0.6.

17. A differential carrier according to claim 3, wherein, in the region adjoining the first portion, the transition portion of the inserted arm comprises a first radius (R1), and a ratio of the first radius (R1) relative to the diameter (D) of the second portion ranges between 0.4 and 0.6.

18. A differential carrier according to claim 4, wherein, in the region adjoining the first portion, the transition portion of the inserted arm comprises a first radius (R1), and a ratio of the first radius (R1) relative to the diameter (D) of the second portion ranges between 0.4 and 0.6.

19. A differential carrier according to claim 3, wherein in the region adjoining the second portion, the transition portion comprises a second radius (R2), and a ratio of the second radius (R2) relative to the diameter (D) of the second portion ranges between 0.4 and 0.6.

20. A differential carrier according to claim 4, wherein in the region adjoining the second portion, the transition portion comprises a second radius (R2), and a ratio of the second radius (R2) relative to the diameter (D) of the second portion ranges between 0.4 and 0.6.

21. A differential carrier according to claim 5, wherein in the region adjoining the second portion, the transition portion comprises a second radius (R2), and a ratio of the second radius (R2) relative to the diameter (D) of the second portion ranges between 0.4 and 0.6.

* * * * *